United States Patent [19]

Brooker

[11] Patent Number: 4,510,199

[45] Date of Patent: Apr. 9, 1985

[54] RELEASE SHEETS FOR LAMINATES WITH WAX AND ALGINATE SALT RELEASE LAYER

[75] Inventor: Lenon G. Brooker, Hampton, S.C.

[73] Assignee: Westinghouse Electric Corp., Pittsburgh, Pa.

[21] Appl. No.: 599,899

[22] Filed: Apr. 13, 1984

[51] Int. Cl.³ ............................................. B32B 31/00
[52] U.S. Cl. .................................. 428/248; 427/202; 427/407.1; 427/411; 427/412; 427/416; 428/251; 428/252; 428/284; 428/285; 428/286; 428/287; 428/484; 428/485; 428/487; 428/688
[58] Field of Search .............. 428/248, 251, 252, 284, 428/285, 286, 287, 484, 485, 487, 688; 427/202, 407.1, 411, 412, 416; 156/288, 289

[56] References Cited

U.S. PATENT DOCUMENTS

| | | | |
|---|---|---|---|
| 3,050,434 | 8/1962 | Emily et al. | 156/289 |
| 3,215,579 | 11/1965 | Hagen | 156/289 |
| 4,243,461 | 1/1981 | Jaisle et al. | 156/288 |
| 4,263,073 | 4/1981 | Jaisle et al. | 156/90 |

Primary Examiner—Marion E. McCamish
Attorney, Agent, or Firm—D. P. Cillo

[57] ABSTRACT

A release sheet useful in laminating assemblies is made and contains a thermosetting resin impregnated fibrous core layer, release coated on at least one side with a mixture of wax and alginate salt, where the solids weight ratio of (wax):(alginate salt) in the coating is from about (3 to 15):(1).

10 Claims, 2 Drawing Figures

RELEASE SHEETS FOR LAMINATES WITH WAX AND ALGINATE SALT RELEASE LAYER

BACKGROUND OF THE INVENTION

Laminates, including decorative laminates, have been made for many years in a plural stack-up laminating operation. In this operation, a plurality of laminate stack-up sets, each set having two stack-ups containing a core layer plus at least one decorative layer, foil, or other surface layer, are placed between press plates with core layers facing each other. To prevent the stack-ups of each set from sticking to each other, release sheets are placed between the core layers of the stack-ups in the set, as described, for example, by Emily Jr. et al., in U.S. Pat. No. 3,050,434. As many as 6 stack-up sets, with associated press plates and release sheets, may be placed between heated platens to provide a laminate assembly or pack. In commercial operations, as many as 20 assemblies may be heat and pressure consolidated at each run of the laminating press, to produce, for example, 5 foot × 12 foot decorative or metal clad laminates.

The standard release sheet for many years has been release treated glassine paper. Production of this paper requires a large commercial operation with many involved process steps, and the product is relatively expensive. Use of release treated glassine paper requires that it be handled as a separate type sheet, requiring separate cutting and handling operations. The glassine paper includes a release material, usually a chromium complex, such as stearato chromic chloride, and after separation of the laminates, must be completely, deep sanded off the core to which it bonds, so that the laminate will be glue adherable.

Recently, attempts have been made to produce in-house release sheets from standard Kraft paper core stock, to reduce cost, handling, and sanding operations. In Emily Jr. et al., U.S. Pat. No. 3,050,434, Kraft paper core sheet was impregnated with phenolic resin and then coated with a film of the salt of an alginic acid, such as sodium alginate, for use as a release sheet. After release, sanding off the alginate film was usually required. It was found however, that the alginate salt was mostly absorbed by the paper, with resultant release problems. Hagen, in U.S. Pat. No. 3,215,579, first sized the Kraft paper core sheet with an aqueous solution of a water soluble alkaline earth or alkaline earth metal salt, such as calcium chloride and the like, before impregnating with phenolic resin, and finally coating with a film of the salt of an alginic acid.

Even the Hagen triple operation seemed to present problems of salt absorption, release, and cost, and so, Jaisle et al., in U.S. Pat. No. 4,263,073, eliminated the phenolic resin completely, and used a particular type of paper web having a water absorption of at least 200 seconds. The use of this special paper caused the alginate salt to be retained on the surface fibers of the release sheet, with substantially no penetration or loss into the interior of the release sheet, thus functioning better as a release.

Jaisle et al. then went on, to further improve the release, in U.S. Pat. No. 4,243,461, by including either a triglyceride or a hydrolyzed or non-hydrolyzed lecithin with the alginate salt used to coat the resin-free, highly surface absorbent, special 200 second series paper. With both Emily Jr. and Hagen, alginate penetration of the release sheet seemed to pose a problem, so that substantial sanding was required. Jaisle et al., in addition to using specialized paper, would also require complete sanding because the paper was not resin impregnated with phenolic resin, as was the core. What is still needed is a simple, inexpensive, in-house method of making release sheets, and releasing laminates from one another, requiring minimal sanding.

SUMMARY OF THE INVENTION

The above problems have been solved and the above needs met, by utilizing a release sheet comprising a "B"-staged, thermosetting resin impregnated fibrous core sheet layer, coated on at least one side with a "B"-staged film of alginate salt dispersed in a wax matrix, where the wax acts to contain the alginate salt. The wax-alginate salt solids are used in the range of from about 1 wt.% to about 5 wt.% of the weight of the uncoated sheet. The effective solids weight ratio of (wax):(alginate salt) is from about (3 to 15):(1). Preferably, two release sheets, each coated on one side, are used between each stack-up in the set, with wax-alginate salt release sides facing each other. After release from the press, only minor sanding is required to remove the non-migrating, wax-alginate salt release admixture, to reach what becomes the bottom resin impregnated core sheet of the stack-up, which sheet will be glue adherable and free of any release agent.

This process allows production of release sheets at lower cost, since the Kraft paper of the release becomes part of the core, not being sanded off. This process eliminates a separate sizing step and separate paper treatment, and dramatically cuts sanding costs. The wax-alginate salt admixture can be applied in a continuous process by coating over fresh resin impregnated fibrous sheet, followed by simultaneous "B" staging of both the resin and the wax-alginate release coating.

BRIEF DESCRIPTION OF THE DRAWING

For a better understanding of the invention reference may be made to the preferred embodiments exemplary of the invention, shown in the accompanying drawings, in which.

DESCRIPTION OF THE PREFERRED EMBODIMENTS

Figure 1:
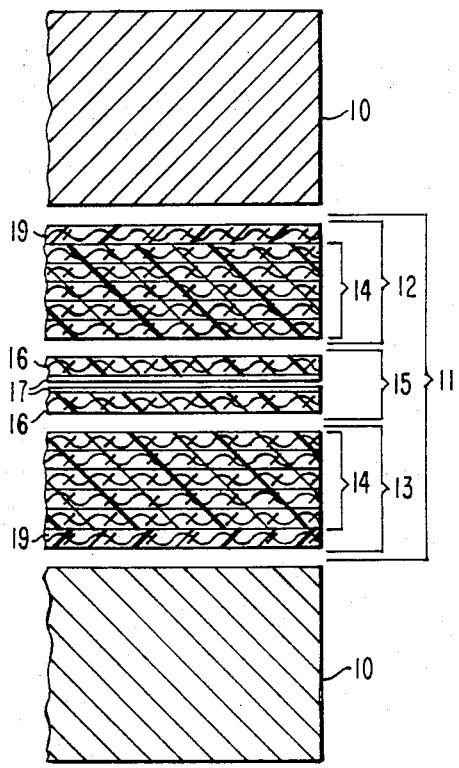
FIG. 1 illustrates, in a fragmented view, one laminate stack-up set, with associated press plates and release sheet.

Referring now to the drawing, specially fabricated, generally smooth press plates, 10, about 0.125 inch (0.317 cm.) thick, are shown with a laminate stack-up set, 11, therebetween. The laminate stack-up set usually contains two laminate stack-ups, 12 and 13. The laminate stack-ups usually consist of 2 to 10 sheets of phenolic, usually phenol-formaldehyde, or cresylic-aldehyde, or polyester, or epoxy, thermosetting resin impregnated Kraft paper or other cellulosic or fibrous sheet, such as, cotton linters paper, mica paper, glass cloth, Dacron (polyethylene terephthalate) fabric, cotton fabric, or the like, each about 2 mils to 25 mils thick, to provide a core layer 14.

In the case of a decorative laminate, the core layer, usually Kraft paper, is covered by a melamine, usually melamine-formaldehyde, resin-impregnated, fine alpha-cellulose or other cellulosic decorative or print sheet 19, having, for example, a plain color, wood grain, or marble decorative pattern. If a wood grain or marble pattern is used, a melamine resin-impregnated, fine alpha-cellulose or other cellulosic protective overlay sheet (not shown) is generally used to cover the pattern. When a plain color decorative sheet is used, no protective overlay is needed and it may be omitted. For other types of decorative laminates, or for metal-clad laminates, a copper, aluminum or other metal foil can be substituted for the print sheet 19. A set of release sheets, 15, is shown disposed between the laminate stack-ups 12 and 13.

The release sheets may be used singly, especially if release coated on both sides, but are preferably used in sets, with release coatings on one side. The release sheets consist of a thermosetting resin-impregnated Kraft paper or other cellulosic or fibrous core sheet 16, facing the core layer 14 of a laminate stack-up, and a wax-alginate salt release layer 17. The wax-alginate salt layers of the release sheet set face each other. The resin and fibrous sheet used in the release core sheet 16, will be the same as the resin and fibrous sheets used in the laminate stack-up core 14, as described previously, usually a phenolic resin and Kraft paper.

After high pressure laminating, at temperatures of from about 120° C. to about 180° C., and pressures of from about 900 psi. to about 1,500 psi., and release from the press, the release surfaces 17 will easily separate, but the core of the release sheet 16 will be laminated to core 14 of the adjacent laminated stack-up. Sanding off the thin, non-migrating, wax-alginate salt release layer 17 only, will provide glue-adhesive, layer 16 as part of the core 14. It is not necessary to sand off the entire core release layer 16, since removal of about 15% of the release sheet, layer 17 plus some of layer 16, will generally provide a glue-adherable surface.

The wax-alginate salt composition used as release surface 17 contains a solids weight ratio of (wax):(alginate salt) of from about (3 to 15):(1). The alginate salt is generally mixed into an aqueous salt emulsion to provide a thickened composition having a viscosity of from about 100 cps. to about 1,500 cps. at 25° C. In some instances a suitable solvent for the alginate salt, such as acetone, methyl ethyl ketone or an alcohol, including methyl, ethyl and isopropyl alcohols, and the like, may be added to the mixture. The alginate salt is completely and homogeneously dispersed within the wax emulsion after mixing, and the composition can be applied to either a "B"-staged, resin impregnated, unsized fibrous substrate, or a freshly resin impregnated "A"-staged, unsized fibrous substrate. Here, "A"-staged is defined as liquid resin or composition, and "B"-staged is defined as resin or composition, in a non-tacky state with substantially all solvent or liquid removed, dry to the touch, and in the case of a thermosetting resin, capable of further complete cure.

Figure 2:
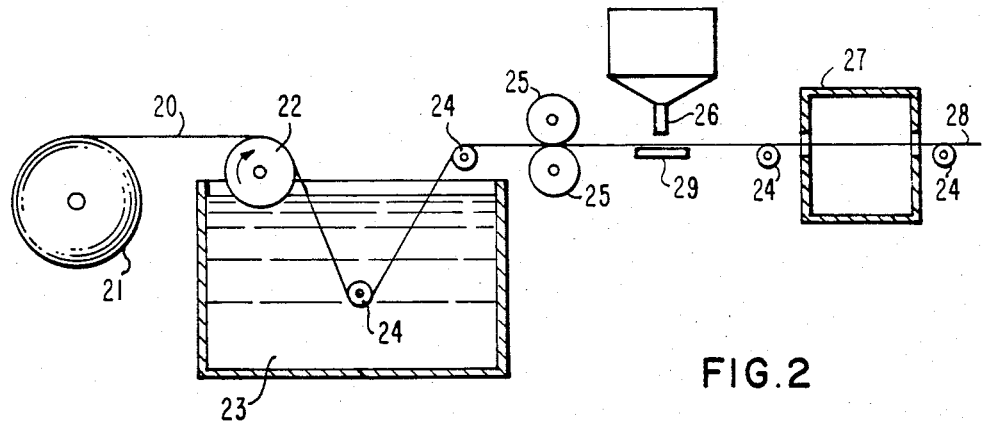
FIG. 2 illustrates a continuous, single step release sheet fabrication process.

When the wax-alginate salt composition is coated on a "B"-staged, resin impregnated substrate, the salt composition must be "B"-staged, in a forced air oven or the like, within the range of about 50° C. to about 175° C., before use as a release sheet. However, due to the composition make up, its flow characteristics, and its viscosity, the composition can be coated onto a freshly resin impregnated substrate, as shown in FIG. 2 of the drawings, without any substantial migration of the alginate salt into the body of the resin. As shown in FIG. 2, porous sheet paper or other fibrous material 20, usually having a thickness of from about 2 mils to about 25 mils (0.002" to 0.025" or 0.005 cm. to 0.064 cm.), is unwound from reel 21 and passed over optional, initial, kiss-coat roller 22, the bottom of which is immersed in resin 23 within bath walls. The sheet travel rate can vary from 3 feet/minute to about 800 feet/minute (0.9 meters/minute to 243.8 meters/minute). The resin 23 may be dissolved in suitable solvents to provide resin solutions with appropriate viscosities.

Guide rolls 24 can be used to direct sheet travel. After exiting the bath, the sheet 20 contains impregnated, "A"-stage liquid resin, and may be passed through a pair of nip rollers 25, so that excess resin is squeezed or otherwise removed from the sheet surface. The resin impregnated, unsized sheet is then passed by an appropriate wax-alginate salt applicator means 26, such as a kiss-coat roller apparatus or wide funnel apparatus. There a differential section of the impregnated sheet is coated with the thick, wax-alginate composition, in the range of from about 1 wt.% solids to about 5 wt.% solids based on the weight of the unimpregnated sheet, i.e., if the unimpregnated sheet weighed 0.04 lb./sq.ft., the range of wax plus alginate salt solids in the coating would be from about 0.0004 lb./sq.ft. to about 0.002 lb./sq.ft. The release coated, resin impregnated sheet, containing all liquid impregnant and coating, is then passed through heating means 27, such as a long, forced air drying oven to dry the impregnating resin and coating; and provide final "B"-staged release sheet 28, which can be cut and stacked or rolled onto a reel. Flat surface 29 is shown under the release coating means.

In both embodiments of the coating process, i.e., coating on "B"-staged or "A"-staged resin impregnated sheet, due to the wax component in the range specified hereinbefore, there is substantially no alginate salt flow or migration into the body of the resin impregnated sheet. The alginate salt is interdispersed in a wax matrix, where the wax acts to contain the alginate salt on the surface of the resin impregnated sheet. The wax thus forms a very effective barrier between the resin impregnated sheet and the alginate salt, concentrating the salt on the top film where its release properties are effective.

Use of less than about 3 parts wax solids to 1 part alginate salt solids, results in alginate salt migration into the body of the release sheet, causing substantial loss of release effectiveness, since the combination of both wax and alginate salt is essential for good release, the wax being ineffective alone. Use of more than 15 parts wax solids to 1 part alginate salt solids, also causes substantial loss of release effectiveness, since the release composition will be essentially all wax, which by itself is an ineffective release. Release coating the impregnated sheet with less than about 1 wt.% solids based on the weight of the unimpregnated sheet will provide minimal release properties. Release coating the impregnated sheet with more than about 5 wt.% solids based on the weight of the unimpregnated sheet will add to the sanding cost of the process, and may require slowing the line speed. Release composition viscosities below about 100 cps. at 25° C. may allow increased alginate salt mobility and allow some penetration of alginate salt into the body of the release sheet. Release composition viscosities more than about 1,500 cps at 25° C. could cause coating problems and require substantial reduction of line speed adding to costs.

The term "wax" as used herein is defined as the definition from *The Condensed Chemical Dictionary*, 9th Ed., Van Nostrand Rheinhold Co., page 924, 925: "A low-melting organic mixture or compound of high molecular weight, solid at room temperature and generally similar in composition to fats and oils except that it contains no glycerides . . . . The major types are as follows: I. Natural: 1. Animal (beeswax . . . ), 2. Vegetable (carnauba, candelilla, bayberry . . . ), 3. Mineral (ozocerite, montan, paraffin, microcrystalline petrolatum, scale wax . . . ), II. Synthetic: 1. Ethylenic polymers and polyol ether-esters ("Carbowax". . . ), 2. Chlorinated naphthalenes ("Halowax"), and 3. Hydrocarbon type via Fischer-Tropsch synthesis . . . ", herein incorporated by reference. The preferred wax in this invention is paraffin or microcrystalline or a mixture of the two. Thus, the term "wax" excludes materials such as triglycerides or diglycerides of fatty acids, such as lecithin (phosphatidyl choline). The term "alginate salt" is defined as a salt of alginic acid, and includes sodium alginate, potassium alginate, iron alginate, ammonium alginate, lithium alginate, and the like, and their mixtures, of which sodium and potassium alginate are preferred, all being readily available from commercial sources.

EXAMPLE 1

Release sheets were prepared in the following manner. A wax-alginate salt release composition was prepared by admixing 0.4 lb. of 100% solids sodium alginate, 9.6 lbs. of a 45% solids dispersion in water of paraffin and microcrystalline wax (4.4 lbs. paraffin plus microcrystalline wax solids), sold commercially by Georgia Pacific Corp. under the trade name GP-090 wax emulsion, and 31.4 lbs. of water. The solids ratio of wax (paraffin+microstalline wax):sodium alginate wax was 11:1. The materials were blended thoroughly until the sodium alginate was completely dissolved. The viscosity of the admixture was about 400 cps. at 25° C.

A 12" wide roll of 99 lb. basis weight (per 3,000 sq.ft.) standard Kraft paper, free of sizing agent, was impregnated by a dip and squeeze process with a thermosetting, phenolic resin, having a mole ratio of phenol:formaldehyde of 1:1.5, and then "B"-staged in an oven. The line speed was 18.3 ft./min. through both the resin bath and a 40 ft. forced air drying oven with an oven temperature ranging from 66° C. to 121° C. The "B"-staged impregnated Kraft paper had a treated resin ratio of 1.4, i.e., 1 part by weight paper was impregnated with 0.4 part by weight resin, and a volatile content of 5.8%.

The "B"-staged, phenolic resin impregnated Kraft paper sheet was then roller kiss-coated with the wax-alginate salt release composition described before in this Example, and fed through the 40 ft., 66° C. to 121° C. oven, at a line speed of 18.3 ft./min., to "B"-stage the release coating, without substantially further curing the phenolic resin. The completely "B"-staged release coated sheet had a uniform film of solid, wax-alginate salt coating, at a weight of about 2 wt.% of the total weight of the uncoated Kraft paper, i.e., (99 lb./3,000 sq.ft.)×0.020=0.00066 lb./sq.ft.

Two 18"×12" sheets of wax-alginate salt coated, phenolic impregnated Kraft paper were placed between two laminate stack-ups (6 phenolic Kraft core sheets, 1 melamine-alpha cellulose print sheet and 1 melamine-alpha cellulose overlay sheet) as shown in FIG. 1 of the drawings, with the wax-alginate salt coating of the release sheets facing each other and the phenolic-Kraft core of the release facing the phenolic-Kraft core of each stack-up. The stack-up set was placed between two polished press plates. The assembly was continued until 6 laminate stack-up sets, with associated press plates and wax-alginate salt coated release sheets were assembled. This pack was molded between heated platens in a pilot laminating press using a 60-minute heating plus cooling cycle, with peak platen temperatures of about 132° C., and a pressure of about 1,200 psi.

After cooling, the pack was disassembled and evaluated for release qualities. The results were that adjacent laminated stack-ups, molded core-to-core, released from each other without any difficulty, with the core of the release sheets being laminated to the core of the adjacent laminated stack-ups. Each laminate was 1/16 inch thick and consisted of 9 sheets (overlay, print, 6 core+1 core from release) of about an equal thickness of about 0.0069 inch. Minor sanding, about 0.0010 inch, or about 14% through the outer "release" core provided a surface free of any apparent wax-alginate salt composition. This sanded surface was tested for glue adherability with outstanding results, indicating that the alginate salt did not migrate through the wax matrix into the body of the release core.

EXAMPLE 2

Release sheets were prepared in the following manner. A wax-alginate salt release composition was prepared by admixing 0.11 lb. of solid sodium alginate, 0.3 lb. of isopropyl alcohol solvent for the alginate salt, 1.44 lb. of a 45% solids dispersion in water of paraffin and microcrystalline wax, GP-090 wax emulsion, (0.66 lb. paraffin plus microcrystalline wax solids) and 5.34 lbs. of water. The solids ratio of wax (paraffin+microcrystalline wax):sodium alginate was 6:1. The materials were blended thoroughly until the sodium alginate was completely dissolved. The viscosity of the admixture was about 350 cps. at 25° C.

A 12" wide roll of 121 lb. basis weight (per 3,000 sq.ft.) standard Kraft paper, free of sizing agent, was impregnated by a dip and squeeze process with a thermosetting phenolic resin having a mole ratio of phenol:-formaldehyde of 1:1.5. The line speed was 18.3 ft./min. and the treated ratio was 1.45. As the saturated Kraft sheet emerged from the squeeze rolls it was passed underneath a specially designed 12"×3" funnel applicator, as shown in FIG. 2 of the drawings, which applied the wax-alginate salt release composition described before in this Example, directly on the surface of the "A"-staged, liquid phenolic resin impregnated paper surface.

The wet, wax-alginate salt coated, phenolic resin impregnated sheet was then fed through a 40 ft., 66° C. to 121° C. oven at a line speed of 18.3 ft./min., to "B"-stage the resin and wax-alginate salt. The completely "B"-staged, coated sheet, had a uniform film of solid, wax-alginate salt coating at a weight of about 1.5 wt.% of the total weight of the uncoated Kraft paper, i.e., (121 lb./3,000 sq.ft.)×0.015=0.00060 lb. solids/sq.ft. This preferred method provides a continuous process adding significantly to the economies of production.

Two 18"×12" sheets of wax-alginate salt coated, phenolic impregnated Kraft paper were placed between two laminate stack-ups (6 phenolic-Kraft core sheets, 1 melamine-alpha cellulose print sheet and 1 melamine-alpha cellulose overlay sheet) as shown in FIG. 1 of the drawings, with the wax alginate salt coating of the release sheets facing each other and the phenolic-Kraft core of the release facing the phenolic-Kraft core of each stack-up. The stack-up set was placed between two polished press plates and the assembly was continued to provide a pack, as described in Example 1, which was molded in a pilot lamination press as described in Example 1.

After cooling, the pack was disassembled and evaluated for release qualities. The results were that adjacent laminated stack-ups, molded core-to-core, released from each other without any difficulty, with the core of the release sheets being laminated to the core of the adjacent laminated stack-ups. Each laminate was 1/16 inch thick and consisted of 9 sheets of about an equal thickness of about 0.0069 inch. Minor sanding, about 0.0010 inch or about 14% through the outer "release" core provided a surface free of any apparent wax-alginate salt composition.

This sanded surface was tested for glue adherability with outstanding results, indicating that the alginate salt was contained in a wax matrix and did not migrate in any substantial amount into the body of the release core. This was true even though both the release coating and phenolc resin were wet upon release coating application, the proper viscosity and wax content being effective to contain the alginate salt. Other alginate salts and waxes could be substituted for those in the Examples and line speeds could be increased up to about 800 feet/minute.

I claim:

1. A release sheet useful in laminating assemblies comprising:
   (A) a thermosetting resin impregnated fibrous core layer, and
   (B) a release coating on at least one side of the core layer, the release coating consisting essentially of a mixture of wax and alginate salt, where the solids weight ratio of (wax):(alginate salt) in the coating is from about (3 to 15):(1).

2. The release sheet of claim 1, where the fibrous core layer is not sized before thermosetting resin impregnation, and the range of wax solids plus alginate salt solids is from about 1 wt.% to about 5 wt.% of the weight of the unimpregnated fibrous core layer.

3. The release sheet of claim 1, being a "B"-staged release sheet, where the alginate salt is selected from the group consisting of sodium alginate, potassium alginate, iron alginate, ammonium alginate, lithium alginate and mixtures thereof, and the fibrous core layer is selected from the group consisting of cellulosic paper, cotton linters paper, mica paper, glass cloth, polyethylene terephthalate fabric, and cotton fabric.

4. The release sheet of claim 1, where the thermosetting resin is selected from the group consisting of phenolic resin, cresylic-aldehyde resin, polyester resin, and epoxy resin, the wax in the release coating provides a matrix containing the alginate salt and preventing alginate salt migration into the thermosetting resin impregnated core, and the release coating is applied as a composition having a viscosity of from about 100 cps. to about 1,500 cps. at 25° C.

5. A method of making a release sheet comprising the steps of:
   (A) impregnating a fibrous sheet with thermosetting resin, and
   (B) coating at least one side of the resin impregnated fibrous sheet with a mixture consisting essentially of a dispersion of wax and alginate salt, where the solids ratio of (wax):(alginate salt) is from about (3 to 15):(1), the mixture has a viscosity of from about 100 cps. to 1,500 cps. at 25° C., and the range of wax solids plus alginate salt solids is from about 1 wt.% to about 5 wt.% of the weight of the unimpregnated fibrous core layer.

6. The method of claim 5, where the fibrous sheet is not sized before step (B), the wax is in aqueous dispersion, the mixture contains a solvent for the alginate salt, and the thermosetting resin in the impregnated sheet is not "B"-staged until after step (B).

7. The method of claim 5, where as a last step, the thermosetting resin in the impregnated sheet and the wax-alginate mixture are heated simultaneously, to "B"-stage the resin and wax-alginate mixture.

8. The method of claim 5, where the alginate salt is selected from the group consisting of sodium alginate, potassium alginate, iron alginate, ammonium alginate, lithium alginate and mixtures thereof, and the fibrous sheet is selected from the group consisting of cellulosic paper, cotton linters paper, mica paper, glass cloth, polyethylene terephthalate fabric, and cotton fabric.

9. The method of claim 5, wherein the thermosetting resin is selected from the group consisting of phenolic resin, cresylic-aldehyde resin, polyester resin, and epoxy resin.

10. The method of claim 5, where after heating, the wax in the coating mixtures provides a matrix containing the alginate salt and preventing alginate salt migration into the thermosetting resin impregnated fibrous sheet.

* * * * *